D. MACOMBER & L. CHAMPION.
TIRE FOR VEHICLE WHEELS.
APPLICATION FILED JUNE 5, 1916.

1,264,199.

Patented Apr. 30, 1918.

Inventor
Dennis Macomber,
Leon Champion,
Ithiel J. Cilley
By           Attorney

UNITED STATES PATENT OFFICE.

DENNIS MACOMBER, OF MUSKEGON, AND LEON CHAMPION, OF TALLMADGE, MICHIGAN.

TIRE FOR VEHICLE-WHEELS.

1,264,199. Specification of Letters Patent. Patented Apr. 30, 1918.

Application filed June 5, 1916. Serial No. 101,715.

*To all whom it may concern:*

Be it known that we, DENNIS MACOMBER and LEON CHAMPION, citizens of the United States, residing at Muskegon and Tallmadge, in the counties of Muskegon and Ottawa, respectively, and State of Michigan, have invented certain new and useful Improvements in Tires for Vehicle-Wheels, of which the following is a specification.

Our invention relates to improvements in automobile tires, and its objects are: first, to provide a light, strong, and very lasting automobile tire at a nominal cost; second, to provide a cheap, easy, and lasting means of assembling the tire and holding its several parts securely in place in assembled form.

Figure 1:
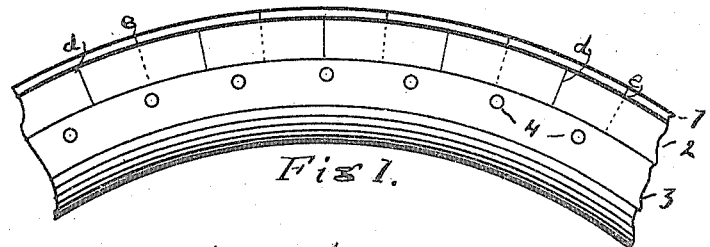
Figure 2:
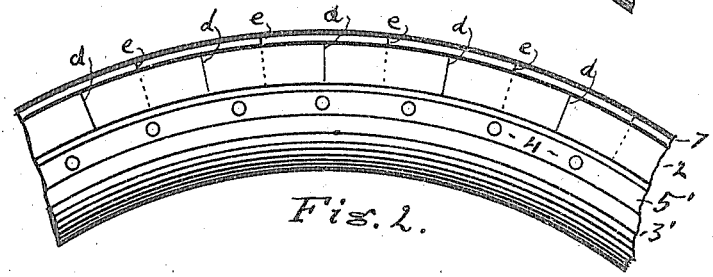
Figure 3:
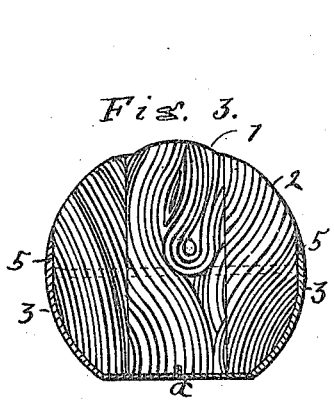
Figure 5:
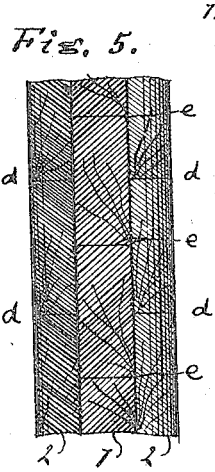
Figure 4:
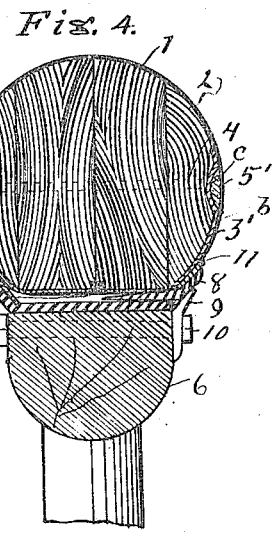

We attain these objects by the mechanism and assemblage of parts shown in the accompanying drawing, in which Figure 1 is a side view of a short segment from the tire of an automobile wheel showing the manner of assembling the several parts of the wheel tire invented by us; Fig. 2 is the same showing a modified form of securing device for securing the parts together; Fig. 3 in a cross section of the form of tire shown in Fig. 1; Fig. 4 is a like view of the tire shown in Fig. 2, showing the manner of securing it to a wheel rim; Fig. 5 is a plan of a tire showing the manner of placing the wood for forming a light, lasting wooden tire for automobiles; and Fig. 6 is a perspective of one of the blocks used.

Similar reference characters refer to similar parts throughout the several views in the drawing.

Figure 6:
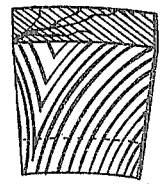

In the construction of these tires we, first, form small blocks of wood, practically as shown in Fig. 6, so they may be formed into a tire with the ends of the grain arranged to form the tread, or main wearing surface of the tire. These blocks are to be made of the exact form and size to be assembled and firmly glued or cemented together, (preferably with water proof glue or cement) to form the tire indicated at 1 and 2. We then make use of a two piece thin sheet metal rim section, as indicated at 3 or 3', that is made to fit closely around the inner surface of the tire, and is firmly secured in place on the tire by means of bolts or rivets 4, passed through the tire and secured at each end to the rim section 3 as indicated in Figs. 1 and 2. It is designed that the rim sections 3 be rolled into form for use upon the tire, and in this process we arrange to have the parts, 5, where the rivets or bolts are applied, considerably thicker than the balance of the rim sections so as to provide a thick, firm bearing for riveting, or otherwise securing the ends of the rivets or bolts to the bands at these points.

In Figs. 2 and 4 we have shown a modified means of securing the rim sections to the tire. In this instance the tire is formed with a groove, b, b, in each side. The rim sections 3' are offset, as at c, c, to fit into these grooves, and metal bands or rings 5', 5', are fitted into the grooves formed in the rim sections 3' and are firmly secured therein by means of rivets or bolts, as 4, passed through these rings and the tire and firmly riveted or otherwise drawn to clamp the rings firmly upon and against the rim sections 3' and thus clamp the rim sections 3' firmly and securely to the tire.

After the tire has been carefully and properly glued and formed it must be turned to the exact and proper form to receive the rim sections 3 or 3', whichever may be used, (or any other available form of rim sections) then the rim sections are applied, as hereinbefore intimated, and the tire is ready to be placed upon the felly 6.

These tires are connected with the felly exactly as an ordinary pneumatic tire is applied to and connected with a felly fitted for the use of demountable tires. In Fig. 4, 7 represents an ordinary felly band mounted on the felly 6, for use with demountable tires. 8 is the wedge formed locking ring in ordinary use, 9 is the locking clip in ordinary use for securing the locking ring 8 and forcing it solidly against the side of the tire, and 10 indicates the bolts that secure the locking clips 9 firmly to the felly 6, and against the locking ring 8 to force this locking ring firmly against the surface of the tire in the usual way of securing demountable tires to the felly.

While it is not absolutely essential to carry out our invention, we prefer that the meeting edges of the sheet metal rim sections 3 and 3' be set up into the surface of the tire for a short distance, as indicated at a, in Figs. 3 and 4, as by this means the rim sections will be held more safely in place when the tire is being carried preparatory to substituting it for a punctured tire.

These tires are designed, particularly, for use in the country, on motor trucks, marketing automobiles, and, occasionally, to replace punctured pneumatic tires.

The rim sections 3, and 3', must be made of metal that is heavy enough to withstand clamping the tires firmly and rigidly upon the felly without danger of straining or breaking the "laid up," wooden tire 1—2, the glued joints of which may be readily disconnected unless thoroughly reinforced with some metal support that will sustain all the strain necessary without danger to the tire proper.

In the construction of these tires we find it necessary, or, at least, very desirable to so lay the blocks in the several layers that when the said layers are assembled and glued or cemented together the connecting joints between the blocks in the several layers, will alternate, as indicated at $d$, $d$, $e$, in Figs. 1, 2, and 5.

As plain wooden tires would be very noisy when being driven over solid pavements, we place a thin rubber, or other available deadening material, as indicated at 11 in Fig. 4, between the tire 7 and locking ring 8 and the surface of the rim sections 3 or 3', as the case may be, to prevent the direct transmission of sound from the tire to and through the felly 6.

What we claim as new, and desire to secure by Letters Patent of the United States, is:

1. In a demountable tire for vehicle wheels, a series of small wooden blocks laid up in alternate sections with the ends of the grain exposed upon the tread or peripheral surface of the tire and having a groove formed longitudinally in the inner surface of the tire, metal rim sections around the inner periphery of the tire and extending well up upon each side of the tire, the meeting edges of the plates offset to enter the groove in the inner surface of the tire, rods passed through the metal rim sections and the tire laterally securing the rim sections firmly to the tire, and means for securing the blocks together to form them into an integral tire body.

2. In a tire for vehicle wheels, a series of small blocks laid up and secured together in alternate sections with the ends of the grain exposed to the tread of the tire, said tire having grooves formed longitudinally around the inner surface, and in the sides of the tire, metal rim sections fitted around the inner periphery of the tire and extending well up the sides of the tire, said rim sections having offsets to enter the grooves both in the inner surface and the sides of the tire, locking rings embedded into the offsets formed in the sides of the rim sections, and rods passed through the locking rings, the wheel rim sections and the tire, laterally, and secured in the locking rings to draw said rim sections firmly against the sides of the tires, and a sound deadening element between the tire and the wheel.

3. In a demountable tire for a vehicle wheel, wooden blocks laid up in alternating positions with the ends of the grain exposed to the tread or outer peripheral surface of the tire, said tire having a concave groove in each side thereof, two sheets of metal secured over the inner periphery of the tire edge to edge, with the meeting edges extended up into the tire, each sheet of metal extending well up on the side of the tire formed to enter the concaved grooves in the sides of the tire, and rods passed through the tire laterally and so secured in the metal at each side as to draw the rim sections firmly into the grooves in the sides of the tire.

Signed at Muskegon, Michigan, May 22 1916.

DENNIS MACOMBER.

Signed at Grand Rapids, Michigan, May 25 1916.

LEON CHAMPION.

Copies of this patent may be obtained for five cents each, by addressing the "Commissioner of Patents, Washington, D. C."